United States Patent [19]

Vertenstein et al.

[11] Patent Number: 4,496,199

[45] Date of Patent: Jan. 29, 1985

[54] PILLOW BLOCK ASSEMBLY AND SEALING SYSTEM THEREFOR

[75] Inventors: Mathieu J. Vertenstein, Denver; Albert A. Amerigian, Aurora, both of Colo.

[73] Assignee: Silver Engineering Works, Inc., Aurora, Colo.

[21] Appl. No.: 541,045

[22] Filed: Oct. 12, 1983

[51] Int. Cl.³ ............................................. F16C 19/28
[52] U.S. Cl. ..................................... 384/474; 384/481; 384/559
[58] Field of Search ............... 308/187, 207 R, 187.1, 308/189 R, 207 A, 189 A, 186

[56] References Cited

U.S. PATENT DOCUMENTS 4,030,785  6/1977  Robinson et al. ............... 308/207 R
4,092,053  5/1978  Riegler et al. .................. 308/207 R
4,235,489  11/1980  Schickling et al. ............. 308/207 R
4,348,067  9/1982  Tooley ............................ 308/187.1

Primary Examiner—Lenard A. Footland
Attorney, Agent, or Firm—Edwin L. Spangler, Jr.

[57] ABSTRACT

This invention relates to an improved pillow block characterized by a cast body containing a main bore for housing an antifriction bearing and cast bolt-receiving slots for mounting same and for attaching endplates thereto that do away with the need for drilled and tapped holes. The endplates are cut from common sheet materials and gang-drilled to provide the apertures that accept the bolts used to assemble same onto the opposite faces of the body with an O-ring therebetween to establish a fluid-tight seal. In like manner, a hole cutter is used to cut rather than drill a central hole for passing the rotating element to be journalled in the bearing.

12 Claims, 4 Drawing Figures

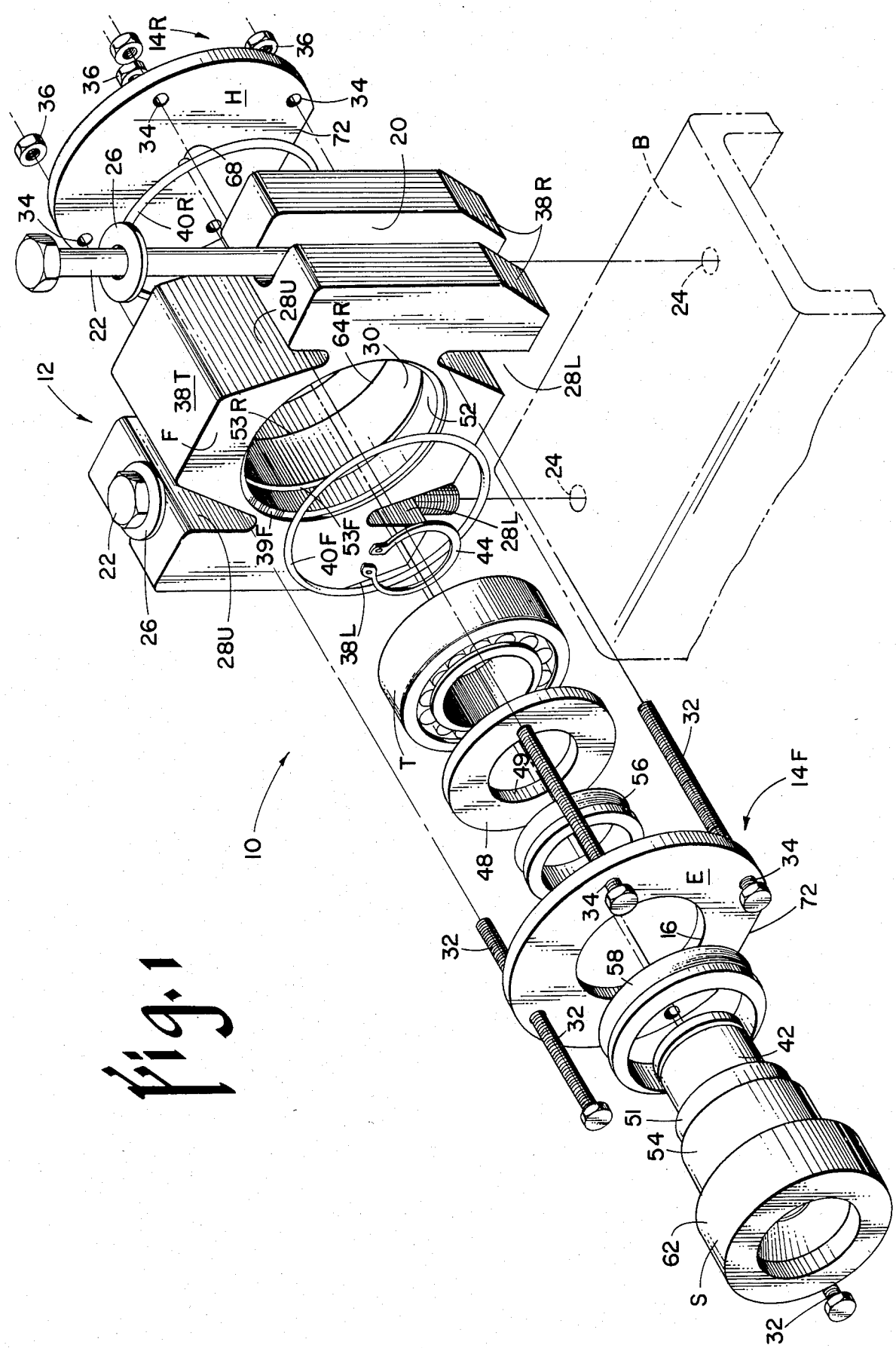

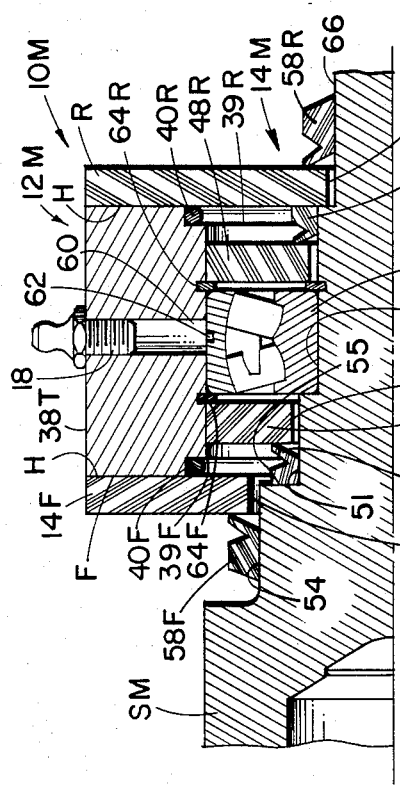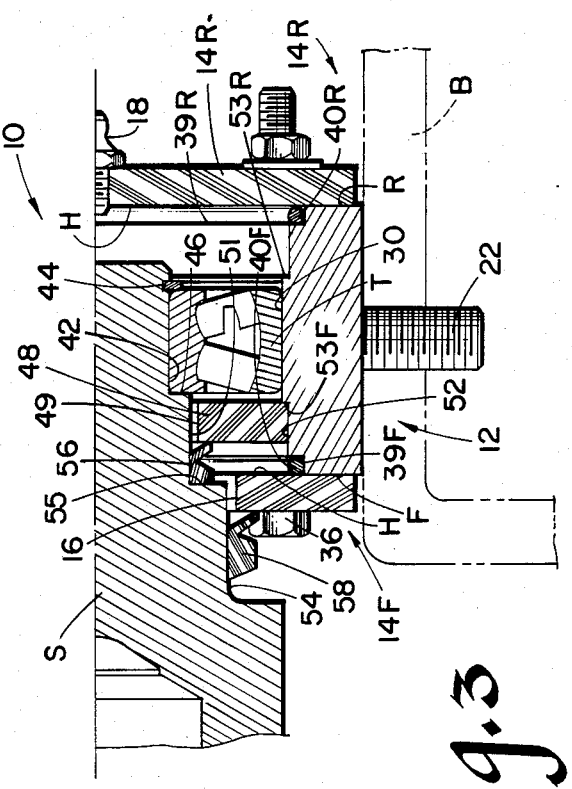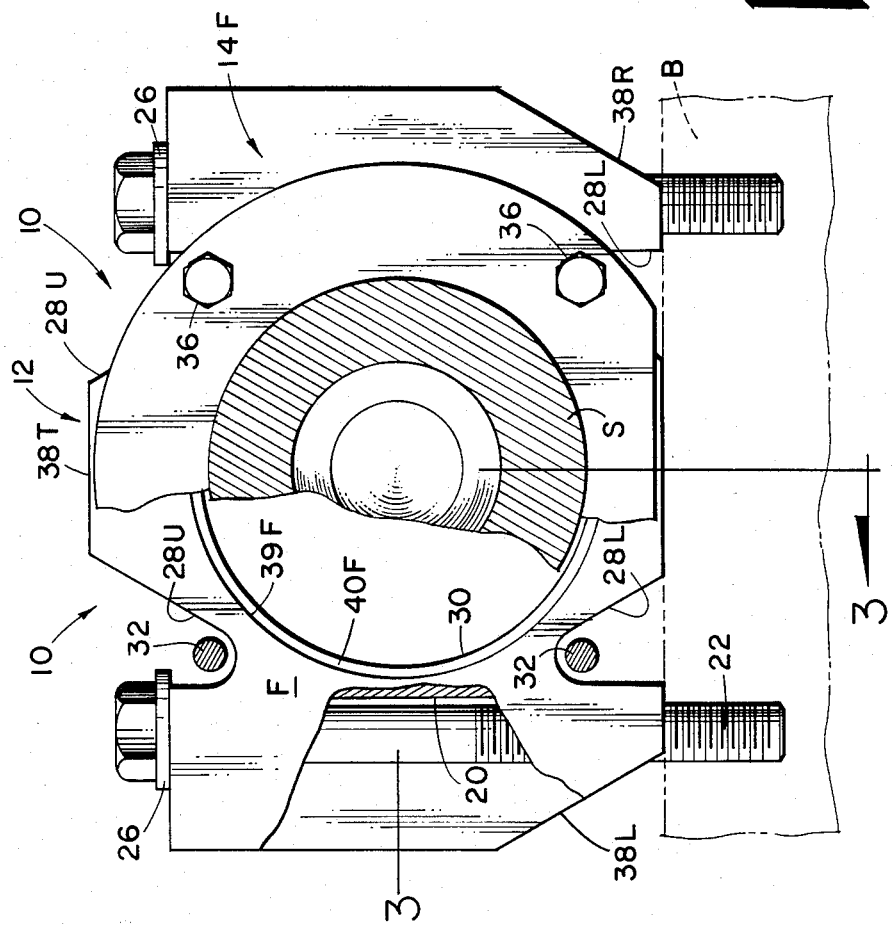

PILLOW BLOCK ASSEMBLY AND SEALING SYSTEM THEREFOR

So-called "pillow blocks" used as a housing for a bearing journalling a shaft or other rotating element are notoriously old in the art and commonplace on many different types of machinery. Functionally, they all do essentially the same thing in the same way and this is true of the pillow block forming the subject matter of the instant invention also. On the other hand, the improved pillow block soon to be described in detail differs from all others known to applicant in its simplicity, ease of manufacture, low cost and elimination of precision machining operations without, at the same time, sacrificing anything in the way of utility, serviceability, ruggedness or versatility.

The conventional pillow block, for instance, requires a minimum of three and usually four or more drilled and tapped holes just to fasten the endplates to the body. These holes are costly, time consuming and unnecessarily precise in that they contribute nothing to the basic function of the unit. While some blocks have oversize holes in integral flanges depending from the body for attaching same to a supporting structure, the flanges are so thin and the fasteners so short that vibration and premature bolt failure become a problem. Even more costly are the mating surfaces that have to be machined, ground flat, grooved to receive seals, counterbored and otherwise operated upon in a manner necessary to produce a finished, fluid-tight assembly. Finally, the cost of the parts even before they are finished is a significant factor if, as is the usual situation, they involve complex castings, etc.

It has now been found in accordance with the teaching of the instant invention that these and other shortcomings of the prior art pillow blocks can in large measure be overcome by the simple, yet unobvious, expedient of bolting simple endplates cut from sheet material to a marginally-slotted cast body with O-rings therebetween for sealing purposes, the resulting assembly oftentimes requiring only a single precision bore for receiving the bearing itself. All the bolts for holding the assembly together as well as attaching same to a suitable support structure pass loosely through extra wide slots or oversize apertures that need not be precisely aligned, yet, do just as good a job as precision-drilled tapped holes. The precision bore in the body together with any other machined surface adjoining the latter which may be needed due to correct for deficiencies in the casting arising by reason of how it was made can usually be made quickly and easily in a single operation using a standard "CNC-type" lathe provided the body is shaped to accommodate its three-jaw chuck. Instead of complex cast endplates that require machining, simple plates are used that can be cut from commonplace sheet materials which can be both "gang-drilled" and provided with whatever large circular cut-outs are needed in a matter of seconds. O-rings interposed between these plates and the ends of the body provide adequate seals for units used in low to medium speed operations. Overall, the pillow block of the present design can be manufactured complete and ready for use in a matter of a few minutes (five to ten).

In addition, while the pillow block just described is utilized for the same applications as other pillow blocks it, nevertheless, provides extra protection for the bearing in the form of a double seal sealing system. Specifically the assembly includes a pair of sealed annular chambers on at least one end of the bearing to catch and trap contaminants.

The aforementioned construction allows fresh lubricant to be introduced through a conventional grease fitting in one of the endplates or the body itself. As the grease is forced into the bearing, it purges some of the old grease while, at the same time flushing the chambers free of trapped contaminants.

A search of the prior art has revealed the following U.S. Pat. Nos. namely: 2,794,691; 3,871,723; 3,941,436; 3,966,275; 4,042,283; and 4,249,784. Both Pray U.S. Pat. Nos. 3,871,723 and Ichikawa 4,249,784 show pillow blocks requiring not one but several precision machining operations. All the remaining patents in the above list, on the other hand, show stamped metal units designed for the most part to carry self-aligning bearings. None of these prior art references even remotely suggests a slotted and V-grooved body against the ends of which are bolted simple endplates cut from common sheet materials which together with ordinary O-rings produce continuous annular lubricant-tight seals between opposed flat surfaces that may not even have to be machined.

Accordingly, it is the principal object of the present invention to provide a novel and improved pillow block most often requiring only a single precision-machined series of surfaces, the most critical of which carries the bearing.

A second objective is the provision of a unit of the type aforementioned wherein no precision-drilled holes are used for either assembly or mounting, but instead, "as cast" extra wide slots in the body and oversize "gang-drilled" apertures in endplates cut from sheet material serve this function.

Another object is to provide a novel external body design having three flat surfaces bearing an angular relation of 120° to one another and arranged to accommodate the jaws of the three-jaw chuck in a CNC-type lathe.

Still another objective of the within described invention is to provide a cast body with nearly full-height V-slots or oversize holes on both sides thereof adapted to receive long fasteners capable of minimizing vibration.

Further objects are to provide a pillow block which is simple, quite inexpensive to produce, rugged, versatile, easy to make and designed to minimize shaft wear since the shaft seals turn with it in wiping contact with stationary plates.

Other objects will be in part apparent and in part pointed out specifically hereinafter in connection with the description of the drawings that follows, and in which:

FIG. 1 is an exploded perspective view of a free pillow block as viewed from a position above and to the right of its shaft-receiving end;

FIG. 2 is a fragmentary front elevation to an enlarged scale, portions having been broken away to conserve space;

FIG. 3 is a quarter section taken along line 3—3 of FIG. 2; and,

FIG. 4 is a quarter section similar to FIG. 3 and to the same scale showing the fixed version of the latter as well as one modified to journal a shaft extending all the way through.

Referring next to the drawings for a detailed description of the present invention, the so-called free version of the pillow block forming the subject matter of FIGS. 1, 2 and 3 has been broadly designated by reference numeral 10 while its body and endplates have been similarly identified by reference numerals 12 and 14, respectively. For purposes of the present description the parts will be described as viewed in FIG. 1 with the front of the body facing the viewer and the rear thereof hidden from view. Thus, in order to distinguish between the endplates, the one having the opening 16 therein to receive the shaft will be designated the "front" endplate and given the letter "F" while the other that includes grease-fitting 18 will be the rear one and so-identified by adding the letter "R". A bed "B" has been shown in phantom lines and is intended to be representative of a frame member to which the pillow block is fixedly attached.

The body 12 which houses the conventional antifriction bearing T comprises a casting, normally gray iron although other metals could be used as well as, perhaps, other materials. Since, however, one of the main objectives of the within described invention is to provide an inexpensive pillow block, gray iron is a good choice since it is cheap, easily cast and readily machined.

To start with, a pair of vertically-disposed essentially parallel "as cast" slots 20 located on opposite sides of the body casting receive the two bolts 22 that fasten same to the bed B. The size of these slots is such as to receive the shanks of the mounting bolts quite loosely thereby eliminating the need for precise alignment with the bolt holes 24 (FIG. 1) in the bed. The bolt heads together with washers 26 bridge any gap left between the shank and the walls of the body alongside the slots 20 as is most clearly shown in FIG. 1. Thus, the body 12 is already simplified to the degree that two drilled holes have been eliminated in favor of "as cast" slots.

Pillow blocks with integrally-cast flange-like feet at the base thereof are old in the art, some even having oversize or elongate holes; however, the thickness of these flanges or feet is such that only short bolts are used. With such a mounting, vibration becomes a problem as does bolt breakage brought on by it. The present pillow block body overcomes this problem by running the U-slots almost the full height of the unit (preferably at least to the top of the bearing) and appropriately long bolts. By so doing, the vibration problems associated with the ordinary shallow mountings are essentially eliminated as bolt breakage.

Following in this same vein, the customary drilled and tapped openings in the front and rear faces of the body used to fasten the endplates thereto have been done away with in favor of four "as cast" V-slots 28 revealed in FIGS. 1 and 2. The two V-slots 28U on top open upwardly and are disposed on the right and left sides of the central bore 30. In a similar manner, the lower pair 28L, open downwardly in essentially vertically-spaced alignment with the corresponding slot of the upper pair just described. Once again we have a construction in which the endplate attachment bolts 32 are very loosely received in their respective V-slots as shown in the upper right-hand corner of the body in FIG. 1 thereby eliminating any problems of lining up the latter with the bolt holes 34 in the endplates. In the particular form shown bolts 32 have heads on one end cooperating with nuts 36 on the other to hold the endplates in sealed relation against the front and rear faces F and R, respectively, of the body.

Some casting techniques like, for example, investment casting, provide surfaces approximating those that have been rough machined, such castings require a minimum of precision machining. For instance, the front and rear faces of the body, the sealing ring grooves at the entryways to the bore, the bottom which rests upon the support frame and even the bearing retaining ring grooves, can be investment-cast to the degree of smoothness required for the pillow block body herein disclosed. This leaves only the bore itself, in fact just that portion thereof carrying the antifriction bearing that need be precision machined in a precision casting.

On the other hand, a grey iron casting which has been made using the less precise sand-casting method will, oftentimes require some additional machining. Specifically, the faces of the body, its bottom surface and the sealing ring grooves are preferably rough machined while that portion of the bore carrying the bearing should be precision machined. If, however, one uses a CNC lathe for this purpose, both faces, the sealing ring and bearing retaining ring groove and the bore itself can all be machined in a single operation ordinarily taking less than five minutes. This leaves only the bottom surface which can be ground flat and located the required distance from the axis of shaft rotation in a second very brief machining operation.

Thus, the only high precision part of the body 12 is the central bore 30. As previously noted, the machining of this bore is greatly facilitated by shaping the body in such a way that it can be "chucked" in the three-jaw chuck of an automatic programmable CNC type lathe. In order to accomplish the above, the top 38T of the body and the lower outside right and left corners, 38R and 38L, respectively, bear a 120° angular relation to one another so as to accommodate the lathe jaws. In the particular form illustrated, while the right and left truncated corners 38R and 38L are located the same radial distance from the center of the bore 30, the top, essentially horizontal flat 38T is not. Nevertheless, a CNC lathe chuck can accommodate such differences provided only that they conform to preselected increments of, say, one-fourth inch for which the machine is programmed. While, obviously, this machined bore can be made in other ways, to do so on a CNC lathe keeps the overall machining time well under five minutes for even a large and lengthy bore and when the features inside the bore and at the entrances thereto must also be rough machined.

The front and rear ends of bore 30 contain O-ring grooves 39F and 39R which receive O-rings 40F and 40R, respectively. These O-rings cooperate in the usual way to mate with the hidden planar surfaces H (FIG. 3) of endplates 14F and 14R to define continuous annular fluid-tight seals around the central bore 30. Most significant, however, is the fact that if precisely cast, the front and rear ends of the body 12 do not have to be ground flat or otherwise machined nor do the mating faces H of the endplates. Simply tightening nuts 36 to pull the endplates into fluid-tight annular sealed contact with the O-rings 44 completes these annular seals.

Shaft S, in the particular form shown, has a multi-stepped cylindrical surface, the smallest section 42 of which, is journalled within the antifriction bearing T. A snap ring 44 seated within an annular groove in the remote or rear end of this shaft section 42 keeps the bearing from coming off the latter. A rearwardly-facing annular shoulder 46 abuts the front end of the bearing T as shown in FIG. 3.

A disk 48 fabricated from plastic or some other sheet material has a control aperture 49 therein sized to loosely receive the next larger shaft section 51. It is sized to be retained with a press fit within section 52 at the front entryway into the bore immediately behind front O-ring groove 39F. Annular abutment 53F that separates bore enlargement 52 from the main bore 30 defines a stop holding apertured disk 48 in spaced relation in front of the bearing T as shown in FIG. 3. A similar annular abutment 53R has been shown spaced behind the bearing and snap ring 44 holding the latter in place.

Cylindrical section 51 of the shaft S lies immediately in front of a still larger cylindrical section 54 from which it is separated by an annular step 55. This step faces rearwardly as seen in FIG. 3 and it lies in opposed spaced relation to the front face of the apertured disk 48. Interposed between these opposed surfaces is a V-ring seal 56 tightly encircling section 51 of the shaft for rotation therewith in wiping contact with the face of ring 48. An annular seal is thus formed which confines lubricant introduced through grease-fitting 18 into the bearing from the rear or backside thereof.

The cylindrical section 54 also mounts a somewhat larger V-ring seal 58, the rear surface of which wipes against the front face of front faceplate 14F as the shaft turns. Opening 16 in the center of faceplate 14F loosely receives shaft section 54 as shown in FIG. 3 so that when fresh lubricant is introduced into the bearing, it will push the grease or other lubricant already there out ahead and past both inner seal 56 and external seal 58 thus flushing the system at the same time it is relubricated.

Before discussing endplates 14 in detail, brief reference will be made to FIG. 4 where the slightly modified fixed version of the block 10M has been illustrated as it would be manufactured for use with a shaft SM extending out both ends. The body 12M would, preferably, be provided with the passage 60 opening into the interior of the bore 30M for introducing lubricant into the bearing TM by means of grease fitting 18. Annular groove 62 encircling the outer race of the bearing would distribution the lubricant therearound in the usual manner and radial holes (not shown) communicating with the latter would carry the grease or other lubricant into the interior of the bearing.

In the case of a fixed block, instead of the stepped bore 30 of FIG. 3, a cylindrical one is all that is needed but one containing a pair of annular grooves for holding snap rings 64F and 64R in place bordering the front and rear ends of the bearing and maintaining same in fixed axial position in the bore. An alternative construction (not shown) would be to replace one of these grooves with a rib formed integral with the block thus eliminating one snap ring. These snap rings 64 perform the function of the annular abutments 53 of the free version of the block by holding apertured disks 48F and 48R in axially spaced relation thereto. As was the situation with the previously described embodiment, both disks 48F and 48R have oversized openings 49 therein sized to loosely encircle cylindrical section 42M of the shaft SM so as to allow lubricant to pass therebeneath.

In addition to seals 56F and 58F located in front of the bearing, a second set 56R and 58R are provided on the rear end of shaft SM. Seal 56R rotates on cylindrical surface 42M in wiping contact with the rear face of disk 48R while seal 58R is mounted on cylindrical shaft section 66 for rotation therewith in wiping contact with the rear face of rear endplate 14M. Since all these seals rotate with the shaft, none of them causes it to wear. Endplate 14M contains a hole 68 sized to loosely receive shaft section 66 but no hole for grease fitting 18 which as noted is located in the body. Obviously, a free pillow block 10 of FIGS. 1, 2 and 3 can easily be adapted to accommodate a shaft going all the way through without exercising anything beyond ordinary mechnical skill as can the fixed block 10M of FIG. 4 be made to accommodate shaft S.

Endplates 14F, 14R and 14M all differ slightly from one another in the size of their central openings; however, in other respects they remain much alike. Bolt-receiving holes 34 are preferably "gang-bored" all at once and by stacking several plates one atop another, their axial alignment will be assured. The central openings as well as these bored bolt holes can be made in a matter of seconds. An adjustable hole cutter of conventional design has been used for cutting the central openings to any size required. The V-slots 28 in the body permit ready axial alignment of the bolt holes 34.

Sheet polyethylene is inexpensive, easy to cut and smooth enough to use for endplates 14 as well as the apertured disks 48 without further machining. Other inexpensive sheet materials, both plastic and metal can, of course, be substituted for polyethylene with equally good results.

Apart from rough shaping such as cutting off the bottom to produce flat 72 or other similar gross requirements, the outside shape of the endplates is immaterial so long as they cover the bore 30 in the body and include material for the bolt holes 34 as the ends of the V-slots. Obviously, they must also form continuous annular seals with the O-rings 44, however, otherwise their shape is of little significance. Not only are endplates 14 inexpensive in terms of the material used which is commercially-available flat sheet plastic stock, but each can be shaped to the degree necessary, bored and have a hole cut therein if needed in a matter of seconds. Despite its simplicity, the resulting pillow block 10 is every bit as rugged and serviceable as those costing several times as much for use in low to medium speed applications where grease will suffice as a lubricant.

What is claimed is:

1. The pillow block for journalling a cylindrical element for rotational movement wherein said element has front and rear cylindrical surfaces separated by an annular shoulder, which comprises: a metal body cast to include front and rear substantially planar end surfaces, right and left sidewalls extending between said end surface each having at least one vertically-disposed passageway sized to loosely receive the shank portion of a fastener used for attaching same to a support thereunder, surfaces atop each of said sidewall passageways defining a seat for the head of the fastener having its shank portion located within the latter, at least three horizontally-disposed oversize passageways spaced around the outside of the body extending between the ends thereof, a bored hole extending from end to end at least a portion of which is sized to receive a bearing and retain same in coaxial relation to said bore, and annular grooves surrounding said bored hole in both the front and rear faces thereof for receiving annular endplate seals; continuous annular static endplate seals seated within grooves in the front and rear faces of the body; front and rear endplates sized to cover both the bored hole and the horizontally-disposed passageways in the body, said endplates having apertures therein horizontally alignable with one another and with one of the horizontally-disposed passageways at opposite ends thereof, and at least one of said endplates having an oversize opening therein sized to loosely receive the cylindrical element for relative rotation; fastener means passing through the horizontally-disposed passageways in the body and aligned apertures in the endplates holding the aforesaid elements in fluid-tight assembled relation against the annular static endplate seals; and, first annular dynamic seal means carried by the cylindrical element for rotation therewith in continuous annular wiping contact with a surface bordering an oversize opening in one or both of the endplates.

2. The pillow block as set forth in claim 1 wherein: the bore includes axially-spaced stop-forming means bracketing the ends of the bearing effective to limit the axial excursion thereof along the bore.

3. The pillow block as set forth in claim 2 wherein: the stop-forming means include surfaces facing the open ends of the bore lying in axially-spaced relation to the adjacent rod of the bearing, at least one disk centrally apertured to loosely receive the cylindrical element for relative rotational movement therein is retained in the bore in juxtaposed position against one of said surfaces of the stop-forming means, and second annular dynamic seal means carried by the cylindrical element for rotation therewith in continuous annular wiping contact with a surface of said apertured disk bordering the central opening therein.

4. The pillow block as set forth in claim 3 wherein said apertured disk and second annular dynamic seal cooperate with one another to release lubricant forced from the bearing under pressure toward the adjacent endplate.

5. The pillow block as set forth in claim 1 wherein: the vertically-disposed passageways extend upwardly to a level substantially above the axis of the bore hole.

6. The pillow block as set forth in claim 1 wherein: the seats atop the vertically-disposed passageways are at least as high as the top of the bore hole.

7. The pillow block as set forth in claim 1 wherein: the vertically-disposed passageways comprise grooves opening sideways.

8. The pillow block as set forth in claim 1 wherein: the horizontally-disposed passageways comprise outwardly opening grooves.

9. The pillow block as set forth in claim 8 wherein: said centrally-apertured disk lies in axially-spaced relation to the adjacent endplate so as to leave an annular gap therebetween, and said second annular dynamic seal means is located within said gap.

10. The pillow block as set forth in claim 8 wherein: externally-accessible means are provided for introducing a lubricant under pressure into the bearing so as to purge same of any lubricant existing therein.

11. The pillow block as set forth in claim 1 in which: two edge surfaces of the body are truncated at an angle selected to cooperate with one another and a third edge surface to receive the jaws of a three-jaw boring mill chuck for boring the bored hole therein.

12. The pillow block as set forth in claim 11 wherein said surfaces bear a 120° angular relationship to one another.

* * * * *